Aug. 4, 1959     E. F. HUDDLE     2,897,900
POTATO DIGGER
Filed Aug. 27, 1957
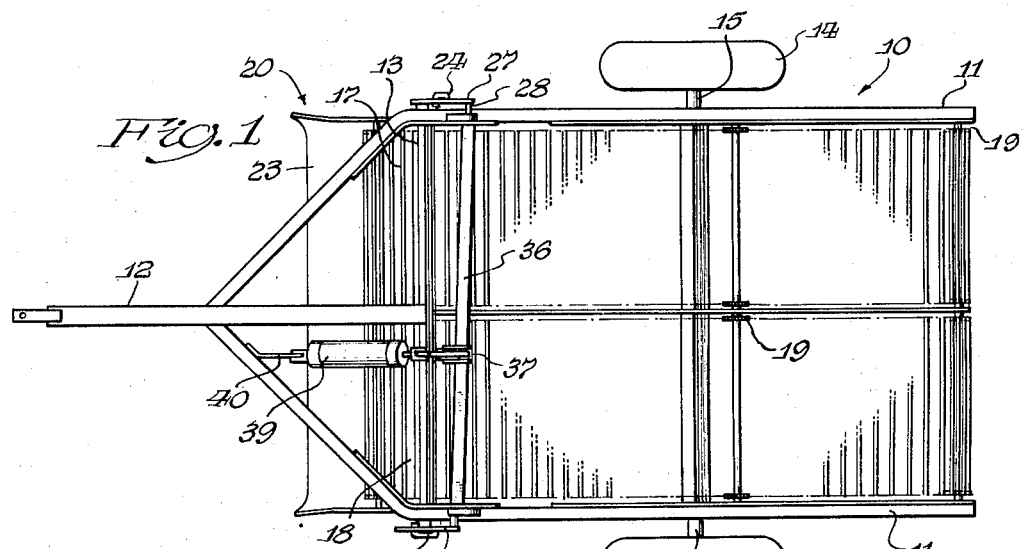
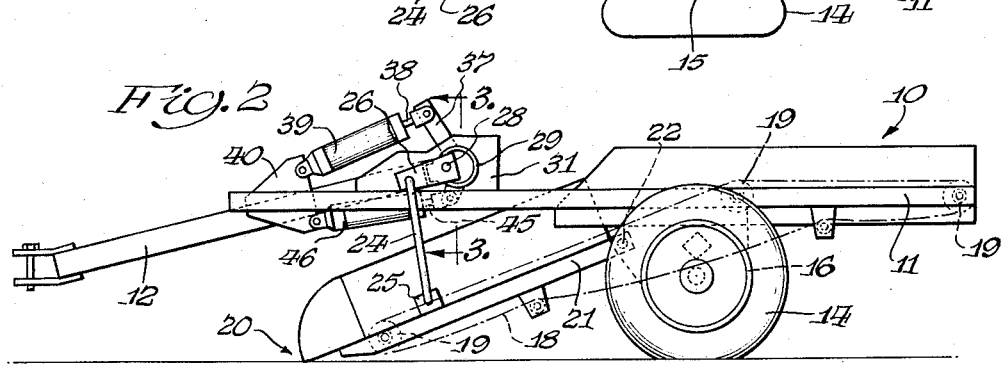
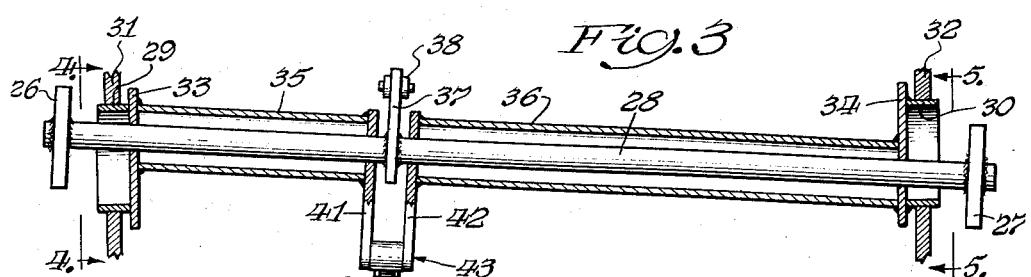
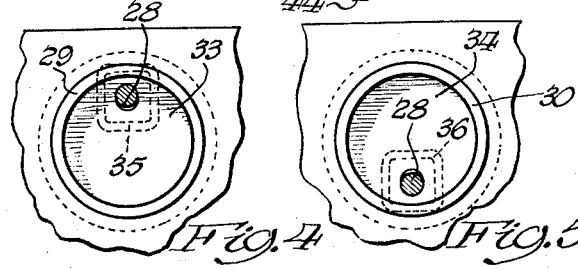
Inventor
Edwin F. Huddle
Paul O. Pippel
A. Horney

United States Patent Office 2,897,900
Patented Aug. 4, 1959

2,897,900

POTATO DIGGER

Edwin F. Huddle, Elmwood Park, Ill., assignor to International Harvester Company, Chicago, Ill., a corporation of New Jersey Application August 27, 1957, Serial No. 680,462

9 Claims. (Cl. 171—126)

This invention relates to agricultural implements and particularly to diggers of root crops such as potatoes and the like. More specifically the invention concerns a machine of this type which is adapted to dig two rows of potatoes simultaneously.

In a conventional potato digger an endless conveyor chain is mounted on a wheeled support or vehicle and extends rearwardly and upwardly from the transverse earth-penetrating blade to receive the potatoes, shake or allow the dirt to fall therefrom, and discharge the potatoes on the ground to be later gathered. In most sections of the country potatoes are planted in hills, and a two-row digger is arranged to penetrate the ground below a pair of adjacent hills. It frequently happens that potatoes in one row have matured at a lower depth than those in an adjacent row, and a conventional digger with a horizontal blade fixed parallel to the ground and adjusted to operate at the depth required for one row of potatoes will penetrate the adjacent row in the middle thereof, slicing and destroying the potatoes. Since the power requirement of digging at anything but shallow depth is great, it is desirable that the digger blade be adjusted to travel only at the depth required to raise from the ground the potatoes in a row.

It is therefore an object of the present invention to provide a potato digger having incorporated therein novel means for adjusting the level of the digging blade to assure the proper penetration of adjacent rows at different depths.

Another object of the invention is the provision of a potato digger having a digger frame pivotally mounted on a wheeled support for vertical movement relative thereto between operating and transport positions, wherein power operated lift means are provided on the support for raising and lowering and for leveling the digger by twisting it about a longitudinal axis to allow the digger to penetrate adjacent rows at different depths.

A further object of the invention is the provision of means for leveling a potato digger frame including a blade and a conveyor, wherein a rockshaft mounted on the support and connected to the digger for raising and lowering the latter upon rocking the shaft, is carried at its ends by transversely spaced lever arms extending in opposite directions from a central pivot axis, whereby the rockshaft can be rocked about its own axis to raise and lower the digger frame and blade, or can have imparted to it a gyratory motion accommodating swinging of its ends in an orbit about the axis of the shaft.

Another object of the invention is the provision of a potato digger mounted on a traveling support for vertical movement relative thereto by means of a rockshaft mounted on the support and connected to the digger frame, wherein the ends of the rockshaft are carried in a pair of rotary members and at locations spaced from and at eccentric or circumferentially spaced locations with respect to the axes of said members.

Other objects and advantages of the invention will become clear from the following detailed description when read in conjunction with the accompanying drawings wherein:

Figure 1 is a diagrammatic plan view, with parts left out, of a potato digging machine incorporating the features of this invention;

Figure 2 is a view in side elevation showing substantially the structure of Figure 1;

Figure 3 is a section, on an enlarged scale taken on the line 3—3 of Figure 2 with parts omitted;

Figure 4 is a sectional view on an enlarged scale from one end, taken on the line 4—4 of Figure 3, showing one of the eccentric rotary members and the relationship of the associated end of the rockshaft thereto, and Figure 5 is a sectional view on an enlarged scale from the other end, taken on the line 5—5 of Figure 3, of the rockshaft shown in Figure 3 illustrating the position of the other end of the rockshaft relative to the associated eccentric member.

In the drawings the numeral 10 designates a traveling support in the form of side frame bars 11 converging at their forward ends and affixed to a central longitudinal draft bar 12 affixed at its rear end to a transverse brace 13. The traveling support 10 includes a pair of laterally spaced wheels 14 mounted on shafts 15 carried by brackets 16 secured to and depending from the frame bars 11.

The potato digging machine with which this invention is concerned is a two-row machine and two side-by-side flights of endless conveyor chains are indicated at 17 and 18, the chains being trained over a plurality of rollers indicated at 19. Forming part of the machine is a digger blade and conveyor assembly 20 of conventional construction comprising two or more laterally spaced frame bars 21 pivotally connected at 22 to the brackets 16, only one of which is shown. A transversely extending earth-penetrating blade 23 is secured to the forward ends of the bars 21, and the entire assembly 20 is capable of vertical swinging movement about the pivots 22 relative to the traveling support 10.

The implement of this invention may be propelled by a tractor or other source of power, and it should be understood that the endless conveyor chains 17 and 18 may be driven by any suitable means, not shown.

Vertical movement of the digger frame 20 between operating and transport positions is accomplished by the provision of a pair of lift links 24 connected at their lower ends to lugs 25, one of which is provided at each side of the digger frame.

The upper ends of lift links 24 are pivotally connected to lift arms 26 and 27 mounted on opposite ends of a transverse shaft 28 which is angled with respect to the frame as indicated in Figure 1. Shaft 28 is rotatably mounted at its ends in a pair of rotary members 29 and 30 in the form of drums rotatably mounted in brackets 31 and 32, respectively, secured to the frame members 11, and having flanged bases 33 and 34, respectively, having openings therein to receive the shaft 28.

Rotary members 29 and 30 are eccentrically secured to a pair of sleeve members 35 and 36, square in cross section, the portions of said drums 29 and 30 to which the sleeves 35 and 36 are secured being offset from the axes of said drums and at circumferentially spaced locations with respect thereto.

Rockshaft 28 is rocked to raise and lower the digger frame 20 by means of an arm 37 to which is connected a piston rod 38 slidable in a cylinder 39 anchored to bracket 40 affixed to the forward end of one of the frame bars 11. Fluid under pressure is supplied in any suitable manner, not shown, to the cylinder 39 to extend piston rod 38 therein and rock shaft 28. This raises and lowers both ends of blade 23 and of the digger frame 20 simultaneously.

As pointed out before, it is important that an operator be able to operate his machine with the ends of blade 23 at different vertical levels to compensate for potatoes in adjacent rows being disposed at different depths. Means are therefore provided for raising one side of the frame 20 while lowering the other by twisting or rotating the frame about a central longitudinal axis. This is accomplished by rotating the rotary members 29 and 30 so as to impart a wobbling or gyratory motion to rockshaft 28 to cause the ends thereof to move in an orbit about a transverse horizontal line as an axis. In order to accomplish this the inner ends of sleeves 35 and 36 have affixed to and depending therefrom, respectively, arms 41 and 42 connected at their ends to form a bridge 43 to which is affixed a lug 44 pivotally connected to a piston rod 45 slidable in a cylinder 46 similar to cylinder 39 and similarly actuated and also anchored to the bracket 40. Fluid under pressure supplied to cylinder 46 causes extension of piston rod 45 therein and rocking of the transverse sleeve member formed by parts 35 and 36, and the rotary members 29 and 30.

The distance from the axes of rotary members 29 and 30 to the eccentric position of the associated ends of shaft 28 relative thereto, represent lever arms extending in opposite directions from the axis of members 29 and 30 so that upon rotation of said rotary members one end of shaft 28 with its lift arm 26 moves upwardly, while the other end of the shaft with its lift arm 27 moves downwardly. The digger frame 20 and its blade 23 are thus tilted to a selected angle with respect to the ground and the parts are held in that position by the cylinders 39 and 46 as long as necessary to dig the potatoes at different depths.

It is believed that the operation of the novel lifting and leveling apparatus of this invention will be clearly understood from the foregoing description. It should likewise be understood, however, that the invention has been described in its preferred embodiment only, and that modifications may be made in the invention without departing from the spirit thereof or the scope of the appended claims.

What is claimed is:

1. In a digger for root crops such as potatoes, a traveling support, a digger frame mounted on the support, a transversely extending blade carried by the digger frame adapted to penetrate the soil in a relatively wide path to raise the potatoes from the ground, lift means on the support operatively connected to the digger frame for raising and lowering the later relative to the support, comprising a transverse rockshaft connected at its ends to said digger frame for raising and lowering the latter and said blade upon rocking the shaft, means for rocking said shaft to raise and lower the frame, and means mounted on the support and operable independently of said lift means for rocking said shaft about an axis extending at an angle to a horizontal transverse line parallel to said blade.

2. In a digger for root crops such as potatoes, a traveling support, a digger frame mounted on the support, a transversely extending blade carried by the digger frame adapted to penetrate the soil in a relatively wide path to raise the potatoes from the ground, lift means on the support operatively connected to the digger frame for raising and lowering the latter relative to the support, comprising a transverse rockshaft connected at its ends to said digger frame for raising and lowering the latter and said blade upon rocking the shaft, means for rocking said shaft to raise and lower the frame, and means mounted on the support and operable independently of said lift means for imparting a gyratory motion to said shaft whereby its ends revolve in an orbit about a transverse line parallel to the ground.

3. In a digger for root crops such as potatoes, a traveling support, a digger frame pivotally connected at one end to the support for vertical pivotal movement, a transversely extending blade at the other end of the digger frame adapted to penetrate the soil in a relatively wide path to raise the potatoes from the ground, means connected between the support and the digger frame operative to tilt said blade about a longitudinal axis to cause one end of said blade to penetrate the soil at a greater depth than the other, comprising transversely spaced rotary members carried by the support and rotatable about a transverse horizontal axis, a rockshaft having its ends mounted in said rotary members at locations eccentric to the axis thereof and at circumferentially spaced locations, lifting connections between the ends of said shaft and said blade, and means for rotating said rotary members.

4. In a digger for root crops such as potatoes, a traveling support, a digger frame pivotally connected at one end to the support for vertical pivotal movement, a transversely extending blade at the other end of the digger frame adapted to penetrate the soil in a relatively wide path to raise the potatoes from the ground, means connected between the support and the digger frame operative to tilt said blade about a longitudinal axis to cause one end of said blade to penetrate the soil at a greater depth than the other, comprising transversely spaced rotary members carried by the support and rotatable about a transverse horizontal axis, a rockshaft having its ends mounted in said rotary members at locations eccentric to the axis thereof and at circumferentially spaced locations, lifting connections between the ends of said shaft and said blade, means for rotating said rotary members to elevate one end of the shaft and lower the other, and means for rocking said shaft about its axis independently of said rotary members to raise and lower the digger frame.

5. In a digger for potatoes and the like, a traveling support, a digger frame mounted on the support for vertical movement with respect thereto and having a relatively wide digger blade thereon adapted to penetrate the soil and raise the potatoes therefrom, a transverse rockshaft carried by the support and operatively connected at its ends to said digger frame, means mounted on the support and operatively connected to the rockshaft for rocking said shaft about its axis to raise and lower both ends of the digger frame simultaneously, and independently operable means for imparting a gyratory motion to said shaft to vertically move opposite ends of the shaft and said digger frame in opposite directions.

6. In a digger for potatoes and the like, a traveling support, a digger frame mounted on the support for vertical movement with respect thereto and having a relatively wide digger blade thereon adapted to penetrate the soil and raise the potatoes therefrom, a transverse rockshaft carried by the support and having arms at the ends thereof operatively connected to said digger frame, means for rocking said shaft about its axis to raise and lower both ends of the digger frame simultaneously, and independently operable means for imparting a gyratory motion to said shaft to effect vertical movement of opposite ends thereof in opposite directions, the connections of said arms to said digger frame being effective to transmit said vertical movement to the digger frame to vertically move opposite ends thereof in opposite directions, said independently operable means comprising means serving as a pair of lever arms pivotally mounted on the support and circumferentially spaced with respect to the pivot axes thereof, and means mounting the ends of said shaft on said lever arms.

7. The invention set forth in claim 6, wherein a rigid sleeve member is anchored at its ends to said lever arms, and said rockshaft is rotatably mounted in said sleeve.

8. The invention set forth in claim 7, wherein separate power means are operatively connected to said sleeve and to said shaft.

9. In a digger for root crops such as potatoes, a traveling support, a digger frame mounted on the support having a transversely extending blade thereon adapted to penetrate the soil in a relatively wide path to raise the potatoes from the ground, and single means mounted on the support operatively connected to opposite ends of said digger frame for raising one end thereof while lowering the other including a transverse shaft mounted on the support and having its ends connected to the ends of the digger frame, and means for tilting the shaft bodily about a longitudinal axis to raise one end and lower the other.

References Cited in the file of this patent

UNITED STATES PATENTS

| | | |
|---|---|---|
| 2,340,488 | Paradise et al. | Feb. 1, 1944 |
| 2,544,744 | Young | Mar. 13, 1951 |